US012670210B2

(12) United States Patent
Wei et al.

(10) Patent No.: US 12,670,210 B2
(45) Date of Patent: Jun. 30, 2026

(54) METHOD FOR VIDEO SEARCHING

(71) Applicant: O Sparks Affiliate Media Group Holdings Limited, Taipei City (TW)

(72) Inventors: Shr-Jin Christopher Wei, Taipei City (TW); Chih-Heng Chung, Taipei City (TW)

(73) Assignee: O Sparks Affiliate Media Group Holdings Limited, Taipei City (TW)

( * ) Notice: Subject to any disclaimer, the term of this patent is extended or adjusted under 35 U.S.C. 154(b) by 0 days.

(21) Appl. No.: 18/924,889

(22) Filed: Oct. 23, 2024

(65) Prior Publication Data

US 2025/0291844 A1 Sep. 18, 2025

(30) Foreign Application Priority Data

Mar. 18, 2024 (TW) ................................. 113109961

(51) Int. Cl.
| *G06F 16/732* | (2019.01) |
| *H04N 21/482* | (2011.01) |
| *H04N 21/8549* | (2011.01) |

(52) U.S. Cl.
CPC ..... *G06F 16/7328* (2019.01); *H04N 21/4828* (2013.01); *H04N 21/8549* (2013.01)

(58) Field of Classification Search
None
See application file for complete search history.

(56) References Cited

U.S. PATENT DOCUMENTS

| 10,650,086 | B1 * | 5/2020 | Knudson | ............... G06F 40/134 |
| 2013/0212113 | A1 * | 8/2013 | Acharya | ........... G06F 16/24578 |
| | | | | 707/748 |
| 2018/0293313 | A1 | 10/2018 | Hauptmann et al. | |
| 2025/0053564 | A1 * | 2/2025 | Li | ........................... G06N 20/00 |
| 2025/0220278 | A1 * | 7/2025 | Bariki | ................... G06F 16/735 |
| 2025/0245265 | A1 * | 7/2025 | Chang | ................... G06F 16/738 |

OTHER PUBLICATIONS

Search Report issued to European counterpart application No. 25152733.9 by the EPO on Jul. 2, 2025.

* cited by examiner

*Primary Examiner* — Richard L Bowen
(74) *Attorney, Agent, or Firm* — MLO, a professional corp.

(57) ABSTRACT

A method for video searching is implemented using a server that stores a plurality of video files. The method includes: obtaining a searching word embedding that represents a search query received from a user device; obtaining a reference word embedding and a reference tag word based on the searching word embedding; obtaining, based on the reference tag word and a plurality of co-occurrences stored in the server, a number of associated co-occurrences, the reference tag word and the number of associated co-occurrences serving as candidate tag words; obtaining a target word embedding that corresponds with one of the candidate tag words, and selecting, based on the target word embedding, at least one target tag word embedding; and selecting, based on the at least one target tag word embedding, at least one target video segment, and presenting the at least one target video segment to the user device.

6 Claims, 4 Drawing Sheets

Figure 3:
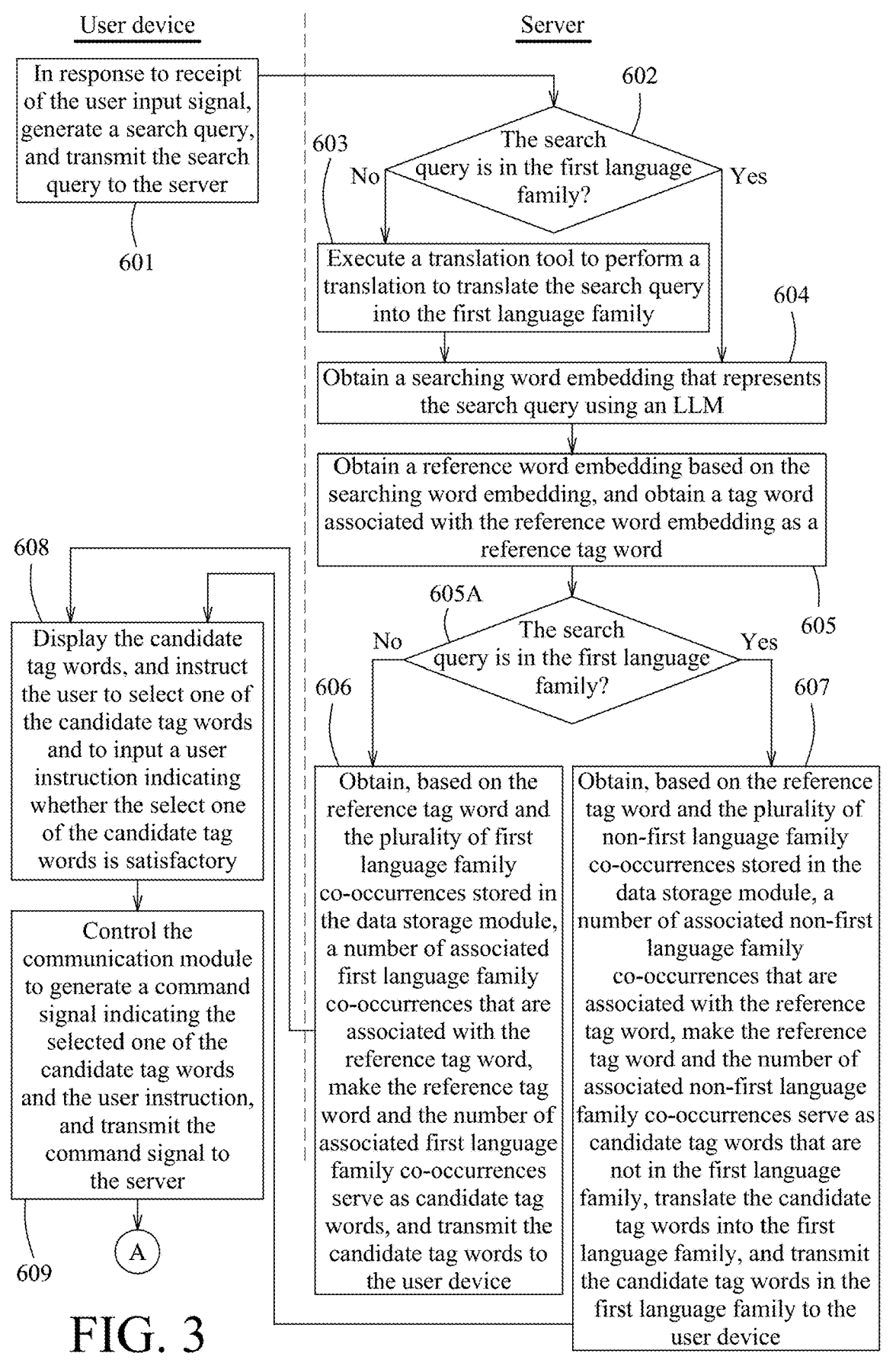

User device                                    Server

In response to receipt of the user input signal, generate a search query, and transmit the search query to the server

601

602

603

The search query is in the first language family?

No

Yes

Execute a translation tool to perform a translation to translate the search query into the first language family

604

Obtain a searching word embedding that represents the search query using an LLM

Obtain a reference word embedding based on the searching word embedding, and obtain a tag word associated with the reference word embedding as a reference tag word

605A

605

The search query is in the first language family?

No

Yes

606

607

608

Display the candidate tag words, and instruct the user to select one of the candidate tag words and to input a user instruction indicating whether the select one of the candidate tag words is satisfactory Control the communication module to generate a command signal indicating the selected one of the candidate tag words and the user instruction, and transmit the command signal to the server Obtain, based on the reference tag word and the plurality of first language family co-occurrences stored in the data storage module, a number of associated first language family co-occurrences that are associated with the reference tag word, make the reference tag word and the number of associated first language family co-occurrences serve as candidate tag words, and transmit the candidate tag words to the user device Obtain, based on the reference tag word and the plurality of non-first language family co-occurrences stored in the data storage module, a number of associated non-first language family co-occurrences that are associated with the reference tag word, make the reference tag word and the number of associated non-first language family co-occurrences serve as candidate tag words that are not in the first language family, translate the candidate tag words into the first language family, and transmit the candidate tag words in the first language family to the user device

METHOD FOR VIDEO SEARCHING

CROSS-REFERENCE TO RELATED APPLICATION

This application claims priority to Taiwanese Invention Patent Application No. 113109961, filed on Mar. 18, 2024, the entire disclosure of which is incorporated by reference herein.

FIELD

The disclosure relates to a method for content searching, and more particularly to a method for video searching.

BACKGROUND

In the field of content search, the application of searching for videos based on search queries has become very common. Conventionally, video search engines that are commercially available are configured to implement video searching by comparing the search queries inputted by the user and, for each of a number of videos stored in a video database, a title and a number of tags associated with the video. When the comparison yields one or more videos that match the search queries, the video search engines then return the one or more videos to the user.

It is noted that in the case that the search queries inputted by the user aren't accurate enough, which may result from the user being unsure of the content of the video he/she is searching for, the resulting video(s) that match(es) the search queries may not be actually what the user is looking for.

SUMMARY

Therefore, an object of the disclosure is to provide a method for video searching that can alleviate at least one of the drawbacks of the prior art.

According to one embodiment of the disclosure, the method is implemented using a server storing a plurality of video files, a plurality of tag datasets that are associated with the plurality of video files, respectively, a plurality of tag words that are in a natural language, a plurality of word embeddings that correspond with the plurality of tag words, respectively, and, with respect to each of the plurality of tag words, a plurality of co-occurrences that are associated with the tag word. A frequency of one of the plurality of co-occurrences that appears in a text file is positively related to a frequency of an associated one of the plurality of tag words that appears in the same text file. Each of the plurality of co-occurrences serves as a tag word. Each of the plurality of tag datasets includes a plurality of tags, each of which corresponds with a video segment of an associated video file. Each of the plurality of tags serves as a tag word. The method includes:

a) in response to receipt of a search query that is in the natural language from a user device operated by user action, obtaining a searching word embedding that represents the search query;

b) obtaining a reference word embedding based on the searching word embedding, and obtaining a tag word associated with the reference word embedding as a reference tag word, wherein the reference word embedding is one of the plurality of word embeddings stored in the server and having a highest similarity with the searching word embedding;

c) obtaining, based on the reference tag word and the plurality of co-occurrences stored in the server, a number of associated co-occurrences that are associated with the reference tag word, and making the reference tag word and the number of associated co-occurrences serve as candidate tag words;

d) obtaining a target word embedding that corresponds with one of the candidate tag words, and selecting, based on the target word embedding, at least one target tag word embedding that has a similarity with the target word embedding higher than a predetermined threshold; and e) selecting, based on the at least one target tag word embedding, at least one target video segment from one of the plurality of video files that is represented by a tag associated with the target tag word embedding, and presenting the at least one target video segment to the user device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

Throughout the disclosure, the term "coupled to" or "connected to" may refer to a connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIGS. 3 and 4 are flow charts illustrating steps of an exemplary video searching procedure according to one embodiment of the disclosure.

DETAILED DESCRIPTION

Figure 1:
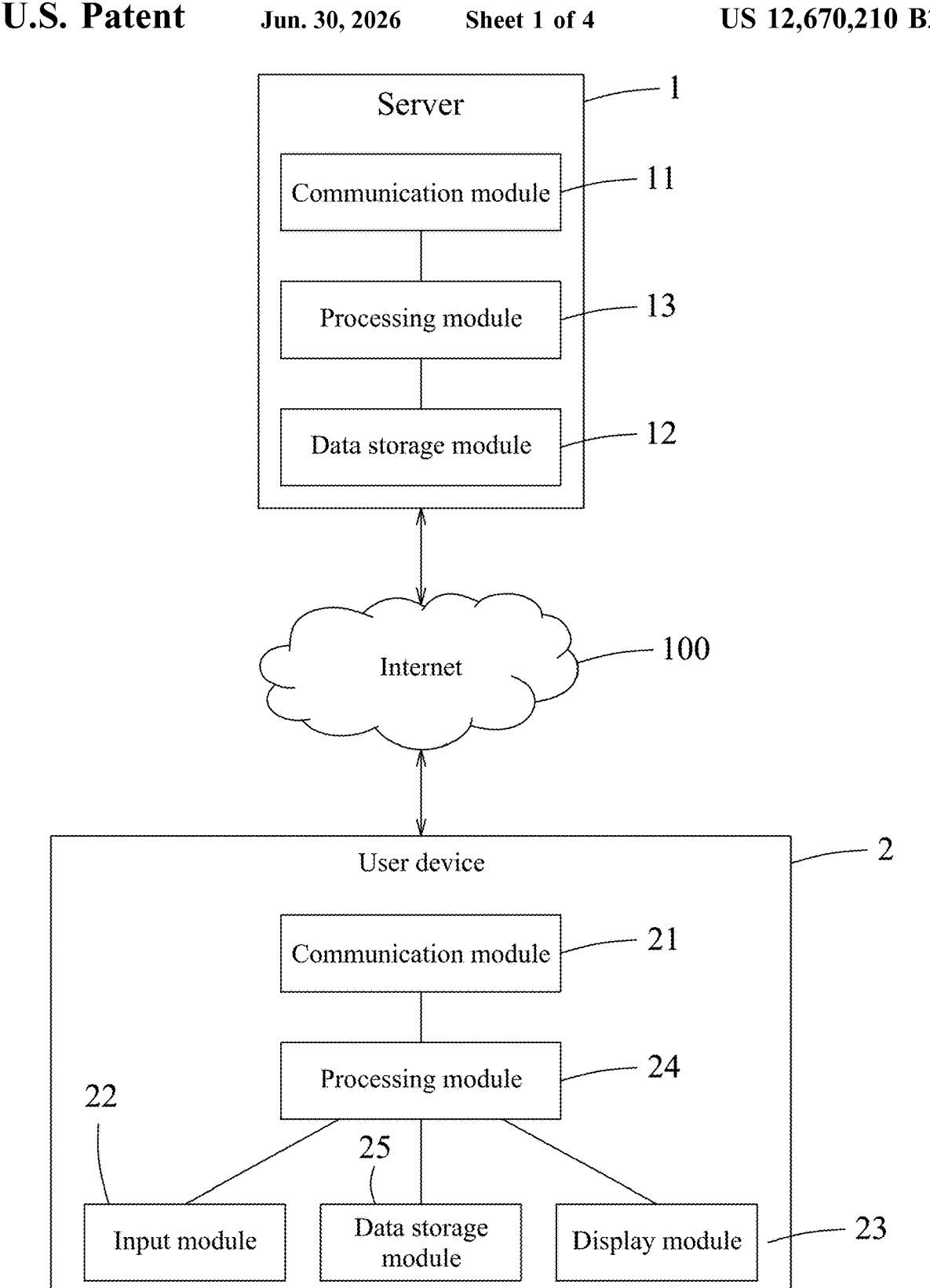
FIG. 1 is a block diagram illustrating a server for implementing a method for video searching according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating a server 1 for implementing a method for video searching according to one embodiment of the disclosure. In this embodiment, the server 1 may be connected to a user device 2 via a network (e.g., the Internet 100). It is noted that while in the embodiment of FIG. 1, one user device 2 is present, in other embodiments, additional user device(s) 2 may be present and connected to the server 1 simultaneously.

The server 1 may be embodied using a video server, a personal computer, or other suitable equipment. The server 1 includes a communication module 11, a data storage module 12, and a processing module 13.

The communication module 11 is connected to the processing module 13, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or the fifth generation (5G) of wireless mobile telecommunications technology, or the like. The communication module 11 enables the server 1 to communicate with the user device 2.

The data storage module 12 is connected to the processing module 13, and may be embodied using, for example, one or more of random access memory (RAM), read only memory (ROM), programmable ROM (PROM), firmware, flash memory, etc. In this embodiment, the data storage module 12 stores a software application that includes instructions that, when executed by the processing module 13, cause the processing module 13 to implement the operations as described below. In embodiments, the data storage module 12 may store an operating system that is adapted for a video hosting platform and that enables the server 1 to run the video hosting platform. The video hosting platform may include a search function that enables users to attempt to search the video hosting platform for videos.

In embodiments, the data storage module 12 further stores a plurality of video files, a plurality of tag datasets that are associated with the plurality of video files, respectively, a plurality of tag words that are in a natural language, a plurality of word embeddings that correspond with the tag words, respectively, and, with respect to each of the tag words, a plurality of co-occurrences that are associated with the tag word. Typically, each of the word embeddings is in the form of a vector. The term "co-occurrences" may be referred to as words that each are likely to appear adjacent to the associated one of the tag words. Generally, a frequency of the co-occurrence appearing in a text file is positively related to a frequency of the associated one of the tag words appearing in the same text file. In this embodiment, each of the co-occurrences may also serve as a tag word.

Each of the tag datasets includes one or more of tags that each correspond with the entirety or a video segment of the associated video file. In some embodiments, the video file includes a plurality of video segments, and each of the tag datasets includes at least one tag for each of the video segments. Each of the tags may also serve as a tag word. In some embodiments, each of the tag words is in a first language family, and has a number of co-occurrences that are in the first language family (referred to as first language family co-occurrences) and a number of co-occurrences that are in languages not in the first language family (referred to as non-first language family co-occurrences). In some embodiments, with respect to each of the tag words, the co-occurrences associated with the tag word may be sorted based on a co-occurring frequency with the tag word.

The processing module 13 may be embodied using one or more of a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The user device 2 may be held by and operated by a user, and may be embodied using a personal computer, a laptop, a tablet, a smartphone, or other suitable equipment. The user device 2 includes a communication module 21, an input module 22, a display module 23, a processing module 24, and a data storage module 25.

The communication module 21, the data storage module 25, and the processing module 24 may be embodied using components similar to the communication module 11, the data storage module 12, and the processing module 13, respectively. The input module 22 may be embodied using a keyboard/mouse. The display module 23 may be embodied using a display screen, a touchscreen, etc. In some embodiments, the input module 22 and the display module 23 may be integrated using a touchscreen.

In use, it may be beneficial for the server 1 to first process the video files stored in the data storage module 12 to enable a more efficient search function. As such, the processing module 13 may be configured to implement a search setup procedure to process the video files.

Figure 2:
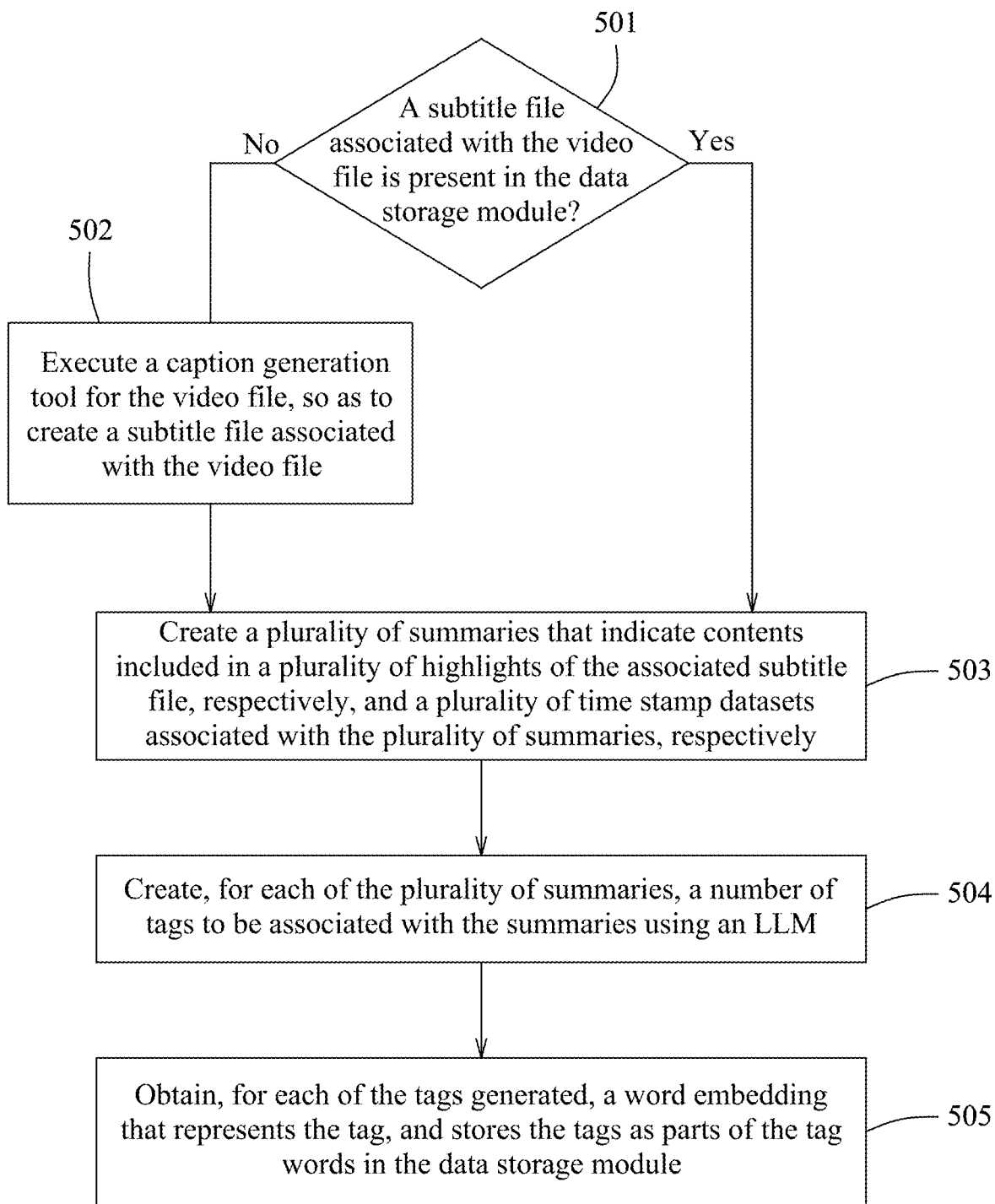
FIG. 2 is a flow chart illustrating steps of an exemplary search setup procedure to process video files according to one embodiment of the disclosure.

FIG. 2 is a flow chart illustrating steps of an exemplary search setup procedure to process the video files according to one embodiment of the disclosure. In the embodiment of FIG. 2, the search setup procedure is implemented using the server 1 shown in FIG. 1.

In step 501, for each of the video files stored in the data storage module 12, the processing module 13 determines whether a subtitle file associated with the video file is present in the data storage module 12. In embodiments, the subtitle file may be in the format of a SubRip subtitle file or other suitable formats. In the case that it is determined that no subtitle file associated with the video file is present, the flow proceeds to step 502. Otherwise, the flow proceeds to step 503. It is noted that in embodiments, the subtitle file may be obtained using a web crawler tool or uploaded by a user. Typically, after the operations of step 501, a plurality of video files that are without associated subtitle files may be detected.

In step 502, the processing module 13 executes a caption generation tool for the video file, so as to create a subtitle file associated with the video file. It is noted that the caption generation tool may be embodied using commercially available software, and details thereof are omitted herein for the sake of brevity.

In step 503 (i.e., in the case that each of the video files has an associated subtitle file), the processing module 13 creates, for each of the video files with an associated subtitle file, a plurality of summaries that indicate contents included in a plurality of highlights of the associated subtitle file, respectively, and a plurality of time stamp datasets associated with the plurality of summaries, respectively. Each of the time stamp datasets may include a starting time stamp and an ending time stamp that indicate a start and a finish of a corresponding one of the highlights of an associated subtitle file (and in turn, the video file). It is noted that the term "highlight" may refer to a specific section of the subtitle file that corresponds with one video segment of the associated video file, and each of the summaries is also associated with one of the video segments of the associated video file. The operations of step 503 may be done by feeding the video file into a large language model (LLM) as an input, and the summaries and the time stamp datasets may be generated as an output.

In step 504, the processing module 13 creates, for each of the plurality of summaries, a number of tags to be associated with the summaries. The operations of step 504 may be done by feeding the summaries into the LLM as an input, and the number of tags may be generated as an output.

In embodiments, the operations of steps 503 and 504 may be done by invoking an application programming interface (API) to communicate with a generative artificial intelligence (AI) model (e.g., the OpenAI Chat completion API or other commercially available models), and to input a prompt to cause the generative AI model to create the summaries and the tags. One exemplary prompt in the first language family may be "please generate a plurality of highlights from the subtitle file, and a summary for each of the highlights; then, please generate a number of tags for each of the summaries". In other embodiments, the tags may be manually inputted by other users accessing the video hosting platform.

In step 505, the processing module 13 obtains, for each of the tags generated in step 504, a word embedding that represents the tag, and stores the tags as parts of the tag words in the data storage module 12.

In embodiments, the operations of step 505 may be done by invoking another API (e.g., the OpenAI Embeddings API or other suitable tools) to obtain the word embedding for each of the tags. Alternatively, the operations of step 505 may be done by using another LLM to obtain the word embedding for each of the tags.

As such, the search setup procedure is completed and the quantity of tag words increases as more video files are being processed.

Figure 4:
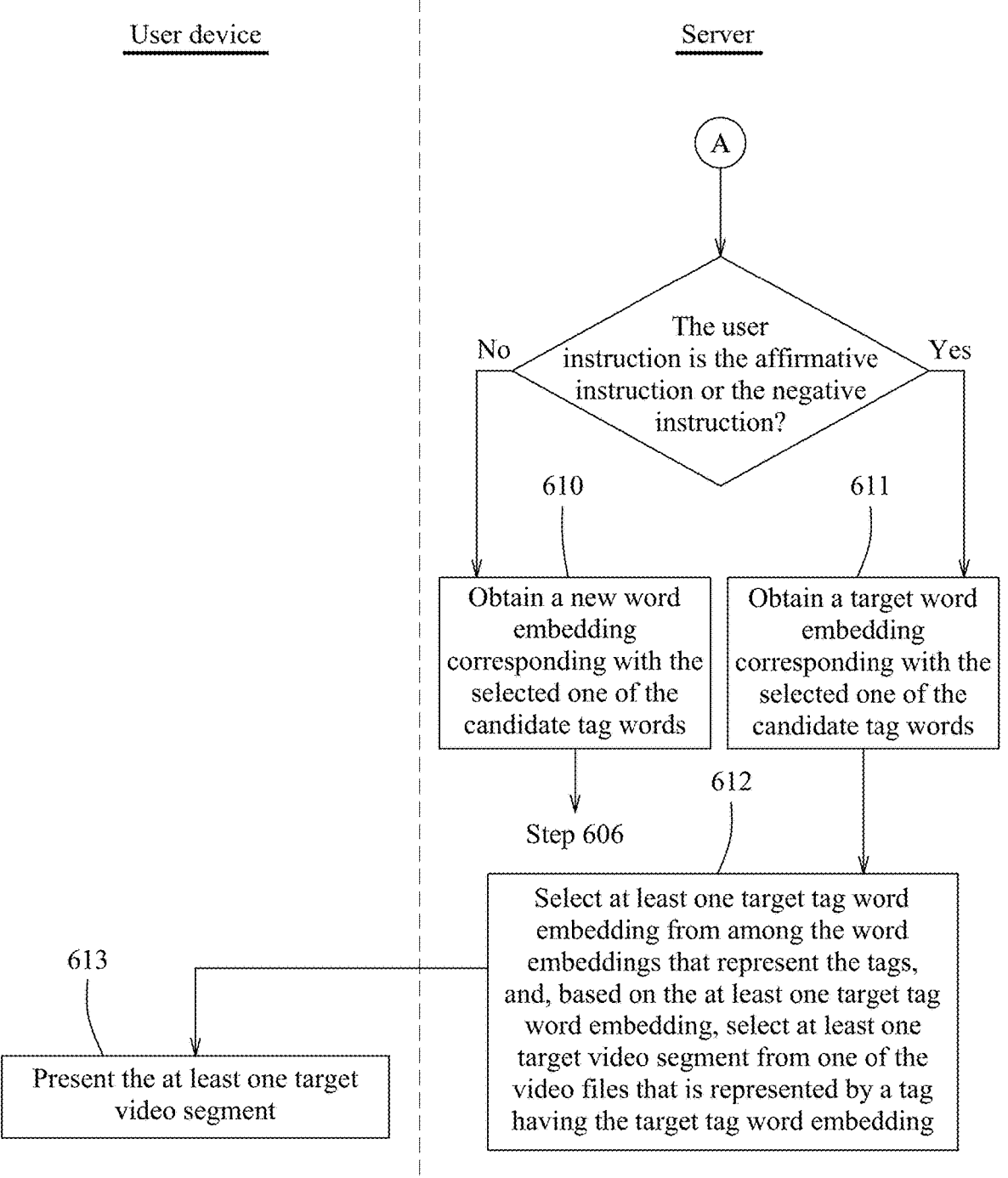

After the search setup procedure is completed, a user operating the user device 2 may attempt to search for videos using the video hosting platform, so as to initiate a video searching procedure. FIGS. 3 and 4 are flow charts illustrating steps of an exemplary video searching procedure according to one embodiment of the disclosure. In the embodiment of FIGS. 3 and 4, the video searching procedure may be implemented using the server 1 of FIG. 1.

In step 601, the user operates the input module 22 of the user device 2 to access the video hosting platform, and inputs a user input signal (by using an interface such as a keyboard or a virtual keyboard displayed on the touchscreen). In response to receipt of the user input signal, the processing module 24 generates a search query, and controls the communication module 21 to transmit the search query to the server 1.

In embodiments, the search query is in the form of a string of text in a natural language, and may or may not be in the first language family (which may be Mandarin or English).

In step 602, in response to the receipt of the search query, the processing module 13 determines whether the search query is in the first language family. In the case that the search query is in the first language family, the flow proceeds to step 604. Otherwise, the flow proceeds to step 603.

In step 603, the processing module 13 executes a translation tool to perform a translation to translate the search query into the first language family. In embodiments, the operations of step 603 may be done by executing a commercially available translation tool (e.g., Google Translate™ or other suitable tools).

In step 604, the processing module 13 obtains a searching word embedding that represents the search query. In embodiments, the operations of step 604 may be done using a manner similar to that of step 505. That is, the operations of step 604 may be done by invoking another API (e.g., the OpenAI Embeddings API or other suitable tools) to obtain the searching word embedding for the search query. Alternatively, the operations of step 604 may be done by using another LLM to obtain the searching word embedding.

In step 605, the processing module 13 obtains a reference word embedding based on the searching word embedding, and obtains a tag word associated with the reference word embedding as a reference tag word.

Specifically, in this embodiment, the processing module 13 calculates a similarity (e.g., the cosine similarity) between the searching word embedding and each of the word embeddings stored in the data storage module 12, and one of the word embeddings that is stored in the data storage module 12 and that has the highest similarity with the searching word embedding is selected as the reference word embedding.

It is noted that in some embodiments, the processing module 13 obtains a plurality of reference word embeddings (each having a similarity with the searching word embedding that is higher than a predetermined threshold) based on the searching word embedding, and makes, for each of the reference word embeddings, a corresponding tag word serve as a reference tag word, which generates a plurality of reference tag words.

Then, in step 605A, the processing module 13 determines whether the search query is in the first language family. In the case that the search query is in the first language family, the flow proceeds to step 606. Otherwise, the flow proceeds to step 607.

In step 606, the processing module 13 obtains, based on the reference tag word and the plurality of first language family co-occurrences stored in the data storage module 12, a number of associated first language family co-occurrences that are associated with the reference tag word, makes the reference tag word and the number of associated first language family co-occurrences serve as candidate tag words, and controls the communication module 11 to transmit the candidate tag words to the user device 2.

It is noted that in the embodiments where a plurality of reference tag words are obtained in step 605, the operations of step 606 may include repeating the above operations with respect to each of the reference tag words to obtain the number of associated first language family co-occurrences, to make all the reference tag words and the associated first language family co-occurrences for all of the reference tag words serve as candidate tag words, and to control the communication module 11 to transmit the candidate tag words to the user device 2.

In step 607, the processing module 13 obtains, based on the reference tag word and the plurality of non-first language family co-occurrences stored in the data storage module 12, a number of associated non-first language family co-occurrences that are associated with the reference tag word, makes the reference tag word and the number of associated non-first language family co-occurrences serve as candidate tag words that are not in the first language family, translates the candidate tag words into the first language family, and controls the communication module 11 to transmit the candidate tag words in the first language family to the user device 2.

It is noted that in the embodiments where a plurality of reference tag words are obtained in step 605, the operations of step 607 may include repeating the above operations with respect to each of the reference tag words to obtain the number of associated non-first language family co-occurrences, making all the reference tag words and all the number of associated non-first language family co-occurrences serve as candidate tag words that are not in the first language family, translating the candidate tag words into the first language family, and controlling the communication module 11 to transmit all the candidate tag words to the user device 2.

It is noted that in the embodiment of FIGS. 3 and 4, the generation of the candidate tag words is done based on the language of the search query, and both the first language family co-occurrences and the non-first language family co-occurrences are stored in the data storage module 12 to achieve a higher predicting accuracy for the candidate tag words. In other embodiments, the data storage module 12 may store additional co-occurrences in additional language families for an even higher predicting accuracy.

In step 608, in response to receipt of the candidate tag words, the processing module 24 controls the display module 23 to display the candidate tag words, and instruct the user to select one of the candidate tag words and to input a user instruction indicating whether the select one of the candidate tag words is satisfactory. For example, the instruction "Please select one of the following tag words that is the closest to what you are looking for, and indicate whether the selected tag word is satisfactory or not" may be displayed on the display module 23. In use, the display module 23 may be controlled to display two additional buttons (e.g., Yes and No), the user input of the "Yes" button indicates an affirmative instruction (i.e., the select one of the candidate tag words is satisfactory), and the user input of the "No" button indicates a negative instruction (i.e., the select one of the candidate tag words is not satisfactory).

Then, after the user operates the input module 22 to select one of the candidate tag words and to input the user instruction, in step 609, in response to receipt of the selected one of the candidate tag words and the user instruction, the processing module 24 controls the communication module 21 to generate a command signal indicating the selected one of the candidate tag words and the user instruction, and transmits the command signal to the server 1.

In step 609A, in response to the receipt of the command signal, the processing module 13 determines whether the user instruction is the affirmative instruction or the negative instruction.

In the case that the user instruction is the affirmative instruction, the flow proceeds to step 611. Otherwise (the user instruction is the negative instruction), the flow proceeds to step 610. It is noted that in some cases, the user may be satisfied with one of the candidate tag words that is not identical to the reference tag word.

In step 610, in response to the negative instruction, the processing module 13 obtains a new word embedding corresponding with the selected one of the candidate tag words. In embodiments, the operations of step 610 may be implemented using a manner similar to that of step 604. Then, the flow goes back to step 606 to obtain a new set of candidate tag words, and to subsequently present the new set of candidate tag words for the user to select. It is noted that in embodiments, such loop may be repeated for a number of times, and the selection of the selected one of the candidate tag words in each time may be recorded and stored in the data storage module 12 for further data processing.

In step 611, in response to the receipt of the affirmative instruction, the processing module 13 obtains a target word embedding corresponding with the selected one of the candidate tag words. In embodiments, the operations of step 611 may be done using a manner similar to that of step 505.

In step 612, the processing module 13, based on the target word embedding obtained in step 611, selects at least one target tag word embedding from among the word embeddings that represent the tags, and, based on the at least one target tag word embedding, selects at least one target video segment from one of the video files that is represented by a tag having the target tag word embedding.

Specifically, in this embodiment, the processing module 13 calculates a similarity (e.g., the cosine similarity) between the target word embedding and each of the word embeddings stored in the data storage module 12, and one of the word embeddings that is stored in the data storage module 12 and that has the highest similarity with the target word embedding is selected as the target tag word embedding. Alternatively, in some embodiments, the processing module 13 obtains a plurality of target tag word embeddings (each having a similarity with the target word embedding that is higher than a predetermined threshold). Then, the processing module 13 determines, for each of the target tag word embeddings, the tag represented by the target tag word embedding, and then determines the target video segment of one of the video files that is represented by the tag.

Then, in step 613, the processing module 13 controls the communication module 11 to transmit the at least one target video segment to the user device 2, so as to enable the processing module 24 to present the at least one target video segment on the display module 23 for the user. It is noted that in the case that multiple target video segments are determined in step 612, the processing module 24 may present a thumbnail of each of the target video segments on the display module 23 for the user to select one of the target video segments to watch.

To sum up, embodiments of the disclosure provide a method for video searching. In the method, a search setup procedure is first implemented to process the video files stored in a server. The search setup procedure involves using a LLM to, for each of the video files with an associated subtitle file, generate a plurality of summaries that indicate the contents included in a plurality of highlights of the associated subtitle file, respectively, and a plurality of time stamp datasets that are associated with the plurality of summaries, respectively, wherein the highlight is a specific section of the associated subtitle file that corresponds with one video segment of the associated video file.

Then, after a user operates a user device to initiate a video searching procedure, the server receiving a search query is configured to first obtain a searching word embedding that represents the search query, obtain a reference word embedding based on the searching word embedding, and obtain a tag word associated with the reference word embedding as a reference tag word. Then, based on a language family of the search query, the server obtains a number of associated co-occurrences that are associated with the reference tag word, and transmits the reference tag word and the number of associated co-occurrences to the user device as candidate tag words. In turn, the user may be enabled to select one of the candidate tag words which may better represent his/her intention for searching. In this manner, at least one target video segment that reflects a more accurate result of the search may be selected and presented to the user.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for video searching, the method being implemented using a server storing a plurality of video files, a plurality of tag datasets that are associated with the plurality of video files, respectively, a plurality of tag words that are in a natural language, a plurality of word embeddings that correspond with the plurality of tag words, respectively, and, with respect to each of the plurality of tag words, a plurality of co-occurrences that are associated with the tag word, a frequency of one of the plurality of co-occurrences that appears in a text file being positively related to a frequency of an associated one of the plurality of tag words that appears in the same text file, each of the plurality of co-occurrences serving as a tag word, each of the plurality of tag datasets including a plurality of tags, each of which corresponds with a video segment of an associated video file, each of the plurality of tags serving as a tag word, each of the plurality of tag words being in a first language family, and having a number of first language family co-occurrences that are in the first language family and a number of non-first language family co-occurrences that are in languages not in the first language family, the method comprising:

a) in response to receipt of a search query that is in the natural language from a user device operated by user action, obtaining a searching word embedding that represents the search query;

b) obtaining a reference word embedding based on the searching word embedding, and obtaining a tag word associated with the reference word embedding as a reference tag word, wherein the reference word embedding is one of the plurality of word embeddings stored in the server and having a highest similarity with the searching word embedding;

c) obtaining, based on the reference tag word and the plurality of co-occurrences stored in the server, a number of associated co-occurrences that are associated with the reference tag word, and making the reference tag word and the number of associated co-occurrences serve as candidate tag words;

d) obtaining a target word embedding that corresponds with one of the candidate tag words, and selecting, based on the target word embedding, at least one target tag word embedding that has a similarity with the target word embedding higher than a predetermined threshold; and e) selecting, based on the at least one target tag word embedding, at least one target video segment from one of the plurality of video files that is represented by a tag associated with the target tag word embedding, and presenting the at least one target video segment to the user device;

wherein the method further comprises, after step a), determining whether the search query is in the first language family; and step c) includes:

in a case where the search query is in the first language family, obtaining, based on the reference tag word and the number of first language family co-occurrences, a number of associated first language family co-occurrences that are associated with the reference tag word, and making the reference tag word and the number of associated first language family co-occurrences serve as the candidate tag words, and in a case where the search query is not in the first language family, obtaining, based on the reference tag word and the number of non-first language family co-occurrences, a number of associated non-first language family co-occurrences that are associated with the reference tag word, making the reference tag word and the number of associated non-first language family co-occurrences serve as the candidate tag words, and translating the candidate tag words into the first language family.

2. The method as claimed in claim 1, further comprising, between steps c) and d):

k) transmitting the candidate tag words to the user device so as to enable the user to select one of the candidate tag words and to input a user instruction that indicates whether the selected one of the candidate tag words is satisfactory; and in response to receipt of a command signal indicating the selected one of the candidate tag words and the user instruction, in a case where the user instruction is an affirmative instruction, obtaining a new word embedding corresponding with the selected one of the candidate tag words and obtaining a new set of candidate tag words, and repeating step k), and in a case where the user instruction is a negative instruction, implementing step d).

3. The method as claimed in claim 1, further comprising, prior to step a):

f) for each of the plurality of video files stored in the server, determining whether a subtitle file associated with the video file is present;

g) in a case where the subtitle file associated with the video file is present, creating, a plurality of summaries that indicate contents included in a plurality of highlights of the subtitle file, respectively, and a plurality of time stamp datasets associated with the plurality of summaries, respectively, each of the plurality of summaries being associated with one of video segments of the video file, each of the plurality of time stamp datasets including a starting time stamp and an ending time stamp that indicate a start and a finish of a corresponding one of the plurality of highlights of the subtitle file; and h) creating, for each of the plurality of summaries, a number of tags to be associated with the plurality of summaries, wherein steps g) and h) are implemented using a large language model (LLM).

4. The method as claimed in claim 3, further comprising, after step f):

in a case where the subtitle file associated with the video file is not present, executing a caption generation tool for the video file, so as to create a subtitle file associated with the video file.

5. The method as claimed in claim 1, wherein step a) includes:

determining whether the search query is in the first language family; and in a case where the search query is not in the first language family, executing a translation tool to perform a translation to translate the search query to the first language family before obtaining the searching word embedding.

6. The method as claimed in claim 1, wherein step a) is implemented by using a large language model (LLM).

\* \* \* \* \*